United States Patent [19]

Gutleber

[11] Patent Number: 4,460,992

[45] Date of Patent: Jul. 17, 1984

[54] ORTHOGONAL CDMA SYSTEM UTILIZING DIRECT SEQUENCE PSEUDO NOISE CODES

[75] Inventor: Frank S. Gutleber, Little Silver, N.J.

[73] Assignee: The United States of America as represented by the Secretary of the Army, Washington, D.C.

[21] Appl. No.: 439,233

[22] Filed: Nov. 4, 1982

[51] Int. Cl.³ .............................................. H04J 13/00
[52] U.S. Cl. ....................................... 370/19; 340/346
[58] Field of Search ..................................... 370/18–22, 370/53, 69.1, 77, 85, 104, 116; 375/1, 25, 38, 96, 375/102–104; 340/346, 348, 349, 347 DD; 455/306; 364/604, 725, 728, 819, 826

[56] References Cited

U.S. PATENT DOCUMENTS 3,908,088  9/1975  Gutleber .............................. 370/104
4,293,953  10/1981  Gutleber .............................. 375/25

OTHER PUBLICATIONS

Weik, Martin H., *Communications Standard Dictionary*, Van Nostrand Reinhold Company, 1983, pp. 56;200.

Primary Examiner—Robert L. Griffin
Assistant Examiner—Albert W. Watkins
Attorney, Agent, or Firm—Anthony T. Lane; Sheldon Kanars; Jeremiah G. Murray

[57] ABSTRACT

An orthogonal code division multiple access communications system is disclosed involving multiple users while providing orthogonal operation, meaning that there is substantially zero interference between users. All of the users employ a mutually different time permutation of the same multi-bit direct sequence pseudo noise code with a synchronous time reference for all of the users being established through a central node or station which communicates with all of the users preferably through a loopback synchronous timing scheme. Each pseudo noise code is followed by an extra processing bit that balances the number of one and zero bits in the composite information bit which has the effect of providing a code structure which will have a cross-correlation value of zero with the other time permutated codes which enables the system to operate as an orthogonal system.

7 Claims, 5 Drawing Figures

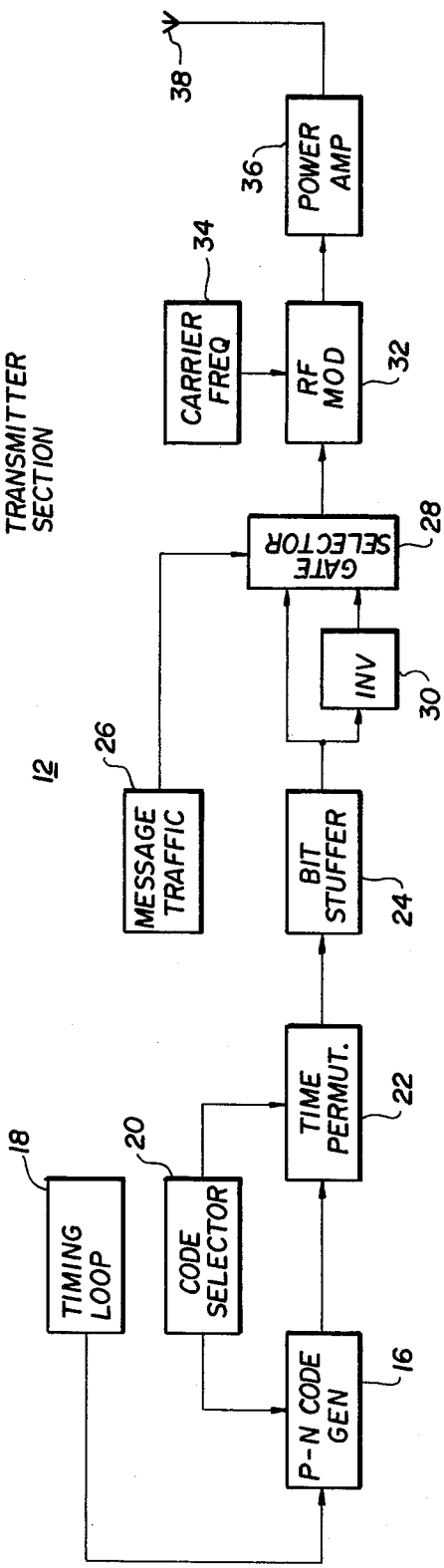
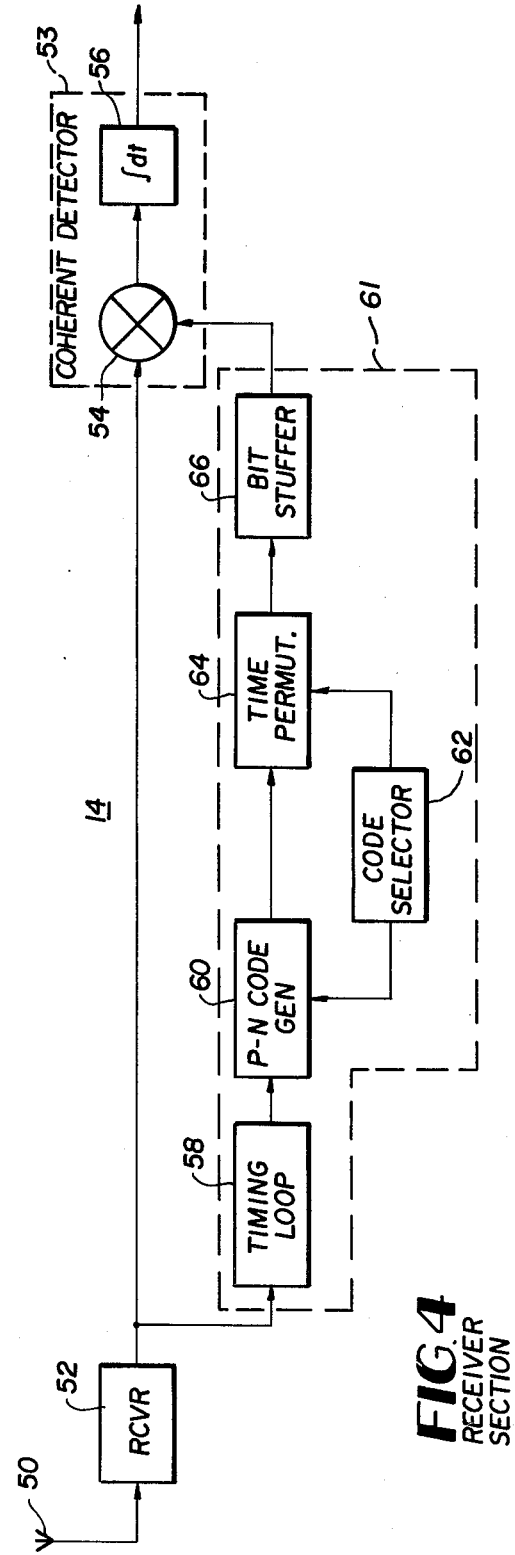

ORTHOGONAL CDMA SYSTEM UTILIZING DIRECT SEQUENCE PSEUDO NOISE CODES

The invention described herein may be manufactured, used and licensed by or for the Government for governmental purposes without the payment to me of any royalties thereon.

CROSS REFERENCE TO RELATED APPLICATION

This application is related to U.S. Ser. No. 407,409 entitled, "Orthogonal Code Division Multiple Access Communications System", filed in the name of Frank S. Gutleber, the present inventor, on Aug. 12, 1982. The teachings of this related application are herein meant to be incorporated specifically by reference.

FIELD OF THE INVENTION

This invention relates generally to noise code communication systems and more particularly to an orthogonal code division multiple access (CDMA) communications system which utilizes direct sequence pseudo noise codes.

BACKGROUND OF THE INVENTION

While code division multiple access communication systems are generally well known, one of the problems associated with such systems is interference between users, meaning that such systems have operated non-orthogonally. Various recent attempts to reduce the probability of self-interference in such systems have been more or less successful. One such method involves time division multiple accessing. A typical example of a time division multiple access communications system is shown and described in U.S. Pat. No. 4,301,530, entitled, "Orthogonal Spread Spectrum Time Division Multiple Accessing Mobile Subscriber Access System", which issued to Frank S. Gutleber, the present inventor, on Nov. 17, 1981. In the communications system as disclosed in that patent, the system utilizes pairs of code signals termed "code mates" which have amplitudes and autocorrelation functions which provide a peak output at a given time and a zero output at all other times. When the code mates are detected and the resultant detected outputs are linearly added, there is provided an impulse output of high amplitude at a given time and a zero output at all other times, making the system orthogonal in operation. Furthermore, the users communicate to each other via a central station or node with all the users employing the same code mate pairs but mutually different time slots within a channel frame period.

In the above mentioned related application, entitled, "Orthogonal Code Division Multiple Access Communication System", there is disclosed a system similar to that disclosed in U.S. Pat. No. 4,301,530; however in the latter system each user is assigned a different unique noise code consisting of a code mate pair for operation in mutual time coincidence within the same multi-bit time period and communication between users occurs simultaneously during one bit, typically the last or nth time bit of that period. Furthermore, each noise code belongs to a particular set of multiplexed noise codes including subsets of code mate pairs where codes of the same orthogonal subset of the code mate pairs have a characteristic whereby the crosscorrelation between any two codes of the same subset is zero at a time corresponding to the peak autocorrelation function value of the desired signal. The system disclosed in this related application as well as U.S. Pat. No. 4,301,530 also includes a loopback synchronous timing scheme to maintain a time reference for all of the users in the system.

SUMMARY OF THE INVENTION

Accordingly, it is an object of the present invention to provide an improved multiple access communications system.

Another object of the present invention is to provide an improved multiple access communications system utilizing direct sequence maximal shift register noise codes.

Still another object of the invention is to provide an improved multiple access communications system which is immune to self-interference and jamming.

Accordingly, these and other objects are achieved in a code division multiple access communications system utilizing direct sequence maximal shift register noise codes wherein each user of the system utilizes a different time permutation of the same n bit pseudo noise code. Each code, moreover, is followed by an extra processing bit that balances the number of one and zero bits in the composite information bit which will cause the user code structures to have a crosscorrelation value of zero with each other, causing the system to operate as an orthogonal system while using overlapping direct sequence pseudo noise codes. The system utilizes a plurality of transceivers having active code generators and coherent detectors in conjunction with means for being synchronized with a synchronous time reference provided through a central node or repeater.

BRIEF DESCRIPTION OF THE DRAWINGS

FIG. 2 is a functional block diagram illustrative of the transmitter portion of transceiver apparatus in accordance with the subject invention;

FIG. 4 is a functional block diagram of the receiver portion of transceiver apparatus in accordance with the subject invention.

DETAILED DESCRIPTION OF THE PREFERRED EMBODIMENT

Figure 1:
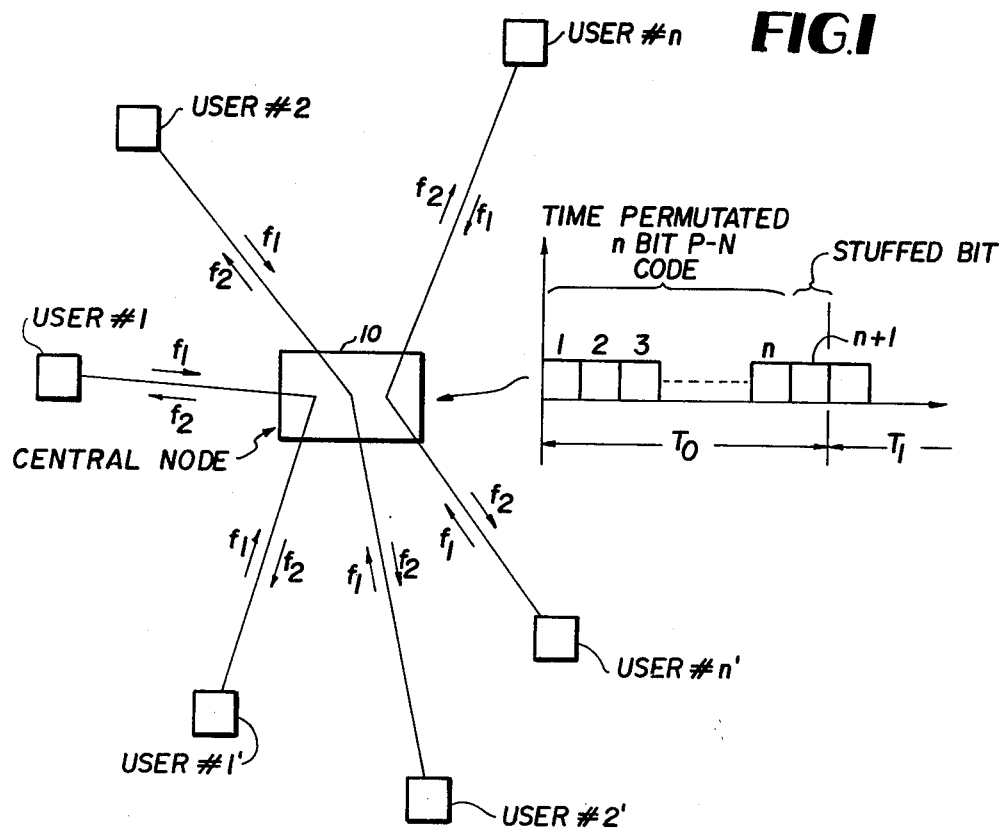
FIG. 1 is a simplified illustration of a ground mobile access system employing orthogonal code division multiple accessing according to the present invention.

Referring now to the drawings and more particularly to FIG. 1, there is illustrated a multiple access communications system such as a mobile subscriber access system employing code division multiple access (CDMA). This arrangement is similar to the mobile subscriber access system shown and described in the above referenced U.S. Pat. No. 4,301,530 and the related application Ser. No. 407,409 entitled, "Orthogonal Code Division Multiple Access Communications System". As shown in FIG. 1, a plurality of users 1 through n are adapted to communicate with each other such that user number 1, for example, is adapted to communicate with user number 1' and vice versa through a central node or repeater 10. Likewise users number 2 and 2' and n and n' respectively communicate through the central node 10 also. The users 1 through n, moreover, communicate utilizing direct sequence pseudo noise codes of $N=n+1$ bits during a common time frame or interval $T_0$. Time synchronism between all users in the system is provided by a loopback synchronous timing scheme so that coded signals being communicated between users arrive at the common node 10 at the same time in order to obtain a common time reference for all the users accessing the system. Although not essential for system operation, it is desirable that all transmissions from the various users to the central node 10 be made in one frequency band $F_1$ and those from the central node to the users be made in a different frequency band $F_2$. This makes the users, which for example are mobile users, to be receptive only to transmissions from the central node 10 which then provides a space time reference for all the user Nos. 1 through n' with the various accessing signals being synchronously locked to a common time reference.

Each user employs a maximal shift register pseudo noise (P-N) code which is selected under a predetermined method of selectivity whereby each user accessing the system is assigned a different permutation of the same N bit P-N code. An additional binary bit (1 or 0) is then pulse stuffed in the (n+1)st time slot to provide a repetitive two state (binary) code of n+1 bits. The sequence is then modulated with digital binary message traffic by selecting either the code sequence as generated or its complement which then phase modulates (PSK) a carrier for transmission. This signal is then detected at the receiving end of the multiple access link using a coherent detector which matches the generated and selected time permutation of the same N bit pseudo noise code. As will be shown, all of the users, each one using a different time permutation of the same selected N bit code will result in a zero output signal of the detector and the system will function as a true orthogonal system while employing a spread spectrum pseudo noise code which would in general be desirable and/or necessary for LPI or anti-jam (A/J) requirements.

Referring now to FIGS. 2, 3, 4 and 5, shown therein are the details of the transmitting and receiving apparatus for implementing the transceiver apparatus employed by the various users 1 through n and 1' through n'. With reference to FIG. 2, shown therein is a block diagram functionally illustrative of the transmitter section 12 which is operable to generate and transmit a carrier frequency modulated with a direct sequence pseudo noise (P-N) code which is transmitted to a receiver section 14 shown in FIG. 4. The transmitter section 12 includes an n bit direct sequence pseudo noise code generator 16 which has two control inputs applied to it from a timing loop 18 and a code selector 20. The timing loop 18 is adapted to provide a time reference to the code generator 16 while the code selector 20 is adapted to establish the sequence of binary 1 and 0 values of each code bit. The coded output from the generator 16 is fed to a time permutation circuit 22 which as will be subsequently shown, is adapted to establish the initial bit of the code sequence. For example, where user No. 1 generates a code 1110, then user No. 2 would generate a 0111 sequence, user No. 3 would generate a 1011 sequence, user No. 4 would generate a 1101 sequence and so on. A bit stuffer 24 coupled to the time permutation circuit 22 is adapted to add a binary bit to the time permutated code in the (n+1)st time slot to balance the number of 1 and 0 bits in the code generated. A message source 26 is coupled to a gate selector 28 which has the output of the bit stuffer 24 directly coupled thereto while a second input is coupled to the output of the bit stuffer 24 through an inverter 30. The message source 26 controls the gate selector 28 such that either the $n+1=N$ bit code or its complement is fed to an RF signal modulator 32 coupled to a carrier frequency source 34. The carrier frequency modulated by the N bit code from the gate selector 28 is fed to an RF power amplifier 36 and then to a transmitting antenna 38 where a noise coded modulated signal is transmitted at an RF frequency $f_1$ to the central node 10 shown in FIG. 1.

Figure 3:
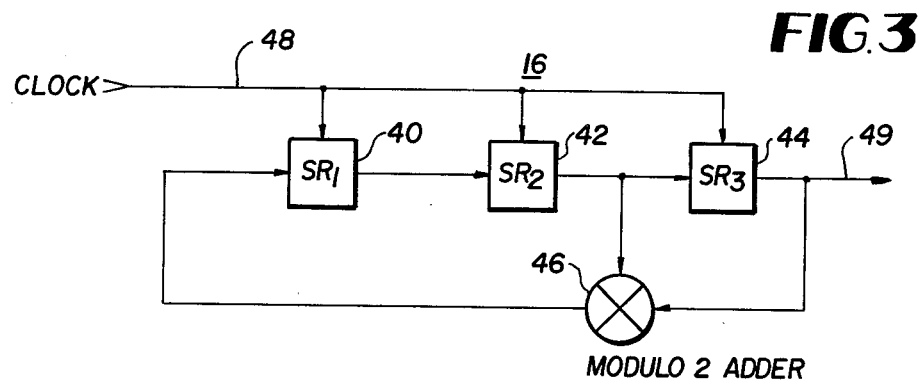
FIG. 3 is a functional block diagram illustrative of an active pseudo noise code generator shown in FIG. 2.

Referring now briefly to FIG. 3, shown thereat is a typical direct sequence pseudo noise code generator 16. The configuration of FIG. 3 is illustrative of a seven bit direct sequence pseudo noise code generator which is adapted to generate, for example, a code of 1110010 where 0 is equal to a unit amplitude pulse of positive polarity and where 1 is equal to a unit amplitude pulse of negative polarity. The pulse generator is comprised of three shift registers 40, 42 and 44 as well as a modulo 2 adder 46. The shift registers are clocked by means of a clock signal applied to a clock bus 48. The shift registers, moreover, are connected in series with the adder 46 combining the outputs of shift registers 42 and 44 to provide an input back to the shift register 40. With the initial output state of shift registers 40, 42 and 44 being in a binary 1 state, clocking and shifting the output of the three registers results in a following sequence of events such that during six clock pulses, a binary sequence of 1110010 appears on the output line 49 in the following manner:

|  | SR-1 | SR-2 | SR-3 |  |
|---|---|---|---|---|
| initial state | 1 | 1 | 1 | |
| 1st shift | 0 | 1 | 1 | |
| 2nd shift | 0 | 0 | 1 | |
| 3rd shift | 1 | 0 | 0 | 7 bit P-N generated code |
| 4th shift | 0 | 1 | 0 | |
| 5th shift | 1 | 0 | 1 | |
| 6th shift | 1 | 1 | 0 | |
| 7th shift | 1 | 1 | 1 | Code repeats |

With a 7 bit direct sequence pseudo noise code such as shown above, the system of the subject invention accommodates n accessing user links wherein each user No. 1 through n would employ a different time permutation of the same 7 bit code with an added stuffed 0 bit as illustrated below:

| User No. | Code Selection |
|---|---|
| | ←——————— $T_o$ ———————→ |
| 1 | 1  1  1  0  0  1  0  0 |
| 2 | 0  1  1  1  0  0  1  0 |
| 3 | 1  0  1  1  1  0  0  0 |
| 4 | 0  1  0  1  1  1  0  0 |
| 5 | 0  0  1  0  1  1  1  0 |
| 6 | 1  0  0  1  0  1  1  0 |
| 7 | 1  1  0  0  1  0  1  0 |
| | permutated code          stuffed bit |

It can be seen that the 0 stuffed bit balances the number of 1 and 0 bits. Where the permutated code (n bits) had a majority of 0's, the stuffed bit (n+1) would be a 1.

Prior to discussing the manner in which the codes shown above operate to provide an orthogonal (mutually non-interfering) system, the receiver portion of a transceiver responsive to retransmissions from the central node 10 at a carrier frequency, for example, $f_2$ will be considered. Such apparatus is shown in FIG. 4 and includes a receiving antenna 50 coupled to a receiver front end 52 tuned to the frequency $f_2$. The output of the receiver front end 52 is directly connected to a multiplier 54 which comprises one element of an active coherent detector 53 which is adapted to correlation detect the desired signal which includes an integrator 56 coupled to the output of the multiplier 54. The other input to the multiplier 54 of the correlation detector comprises a locally generated reference code which is identical to the received N bit code. The reference code generated in the receiver 14 is comprised of a timing loop 58, a pseudo noise code generator 60, a code selector 62, a time permutation circuit 64 and a bit stuffer circuit 66, all inter-connected in the same manner as their respective counterparts shown in the transmitter section of FIG. 2. Accordingly, a received code by user No. 1' from the sender No. 1 correlates with a corresponding locally generated like code to provide a desired output signal.

Figure 5:
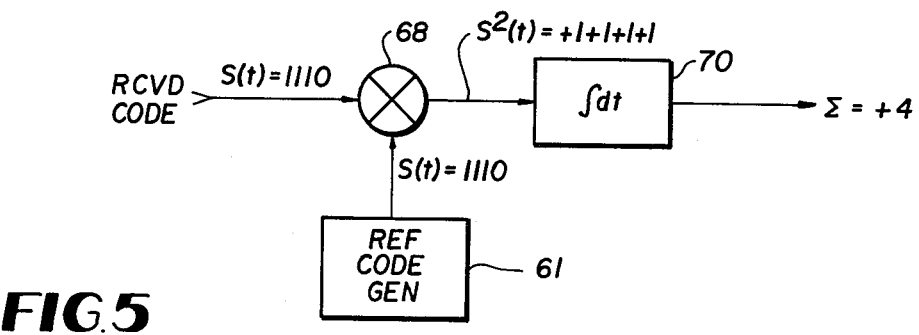
FIG. 5 is a functional block diagram illustrative of the operation of the active coherent detector shown in FIG. 4.

In order to understand the operation of the correlation detector, reference will now be made to FIG. 5 which is illustrative of an active coherent detector adapted to correlation detect a received code, for example, a code $s(t) = 1110$ with a locally generated reference code $s(t)$ which is also a code comprising a sequence of 1110. Since the autocorrelation function equation $\phi_s(\tau)$ is defined by the equation $$\phi_s(\tau) = \int_{-\infty}^{\infty} s(t)\, s(t + \tau)\, dt, \quad (1)$$

it can be seen that autocorrelation involves both integration and multiplication. Accordingly, as shown in FIG. 5, the received code is fed to a multiplier 68 along with a reference code provided by code generator 61. In operation, the multiplier 68 translates all the code bits which are coincident in time and correlate with one another, into a binary value of +1 (this corresponds to $\tau = 0$ in the autocorrelation function process) which are then integrated or summed in an integrator 70 to provide an output signal $\Sigma$.

Considering now the manner in which the various users operate without mutual interference, the following example will illustrate this most important feature of the invention. Considering the effect of, for example, the presence of users 2 through 7 on user No. 1, a composite signal $e_T$ will be received by user 1 according to the following tabulation,

| User No. | Code |   |   |   |   |   |   |   |
|---|---|---|---|---|---|---|---|---|
| 2 | 0 | 1 | 1 | 1 | 0 | 0 | 1 | 0 |
| 3 | 1 | 0 | 1 | 1 | 1 | 0 | 0 | 0 |
| 4 | 0 | 1 | 0 | 1 | 1 | 1 | 0 | 0 |
| 5 | 0 | 0 | 1 | 0 | 1 | 1 | 1 | 0 |
| 6 | 1 | 0 | 0 | 1 | 0 | 1 | 1 | 0 |
| 7 | 1 | 1 | 0 | 0 | 1 | 0 | 1 | 0 |
| $e_T =$ | . | . | . | $1^2$ | $1^2$ | . | $1^2$ | $0^6$ | where the exponent identifies the amplitude.

Noting that $0 = +1$ and $1 = -1$, crosscorrelating the composite signal $e_T$ with the code utilized by user No. 1 results in the following signal $\Sigma$ being generated,

|   |   |   |   |   |   |   |   |   |   |
|---|---|---|---|---|---|---|---|---|---|
|   | . | . | . | $1^2$ | $1^2$ | . | $1^2$ | $0^6$ | $(e_T)$ |
| X | 1 | 1 | 1 | 0 | 0 | 1 | 0 | 0 | (code of user No. 1) |
| $\Sigma =$ | . | . | . | $1^2$ | $1^2$ | . | $1^2$ | $0^6$ | = Zero |

The above crosscorrelation is obtained by multiplying the respective values in the columns of the upper 2 rows and then summing (integrating) the 3rd row.

It can be seen that integrating or summing the product of the code bits over the code time frame $T_o$ results in an output of zero magnitude proving that there would be no interfering energy in the output of the coded coherent detector comprised of the multiplier 54 and integrator 56 of user No. 1 from the presence of all the other 6 users.

The above example, however, assumed that such user is utilizing a positive information bit, meaning the gate selector 28 is outputting the directly connected or a non-inverted code sequence. Consider next, a mix of positive and negative information bits as depicted below where $-1$ is indicative of an inverted sequence while $+1$ denotes a non-inverted sequence. In this case the composite signal $e_T$ becomes,

| User/Info Bit | Code |   |   |   |   |   |   |   |
|---|---|---|---|---|---|---|---|---|
| 2 (−1) | 1 | 0 | 0 | 0 | 1 | 1 | 0 | 1 |
| 3 (−1) | 0 | 1 | 0 | 0 | 0 | 1 | 1 | 1 |
| 4 (+1) | 0 | 1 | 0 | 1 | 1 | 1 | 0 | 0 |
| 5 (−1) | 1 | 1 | 0 | 1 | 0 | 0 | 0 | 1 |
| 6 (+1) | 1 | 0 | 0 | 1 | 0 | 1 | 1 | 0 |
| 7 (+1) | 1 | 1 | 0 | 0 | 1 | 0 | 1 | 0 |
| $e_T =$ | $1^2$ | $1^2$ | $0^6$ | . | . | $1^2$ | . | . |

Crosscorrelating this composite signal $e_T$ with the code utilized by user No. 1 results in a signal $\Sigma$ being generated as:

|   |   |   |   |   |   |   |   |   |
|---|---|---|---|---|---|---|---|---|
|   | $1^2$ | $1^2$ | $0^6$ | . | . | $1^2$ | . | . |
| X | 1 | 1 | 1 | 0 | 0 | 1 | 0 | 0 |
| $\Sigma =$ | $0^2$ | $0^2$ | $1^6$ | . | . | $0^2$ | . | . = Zero |

As before, the crosscorrelation between all of the other users of the system results in a zero output from the correlation detector for user No. 1, hence, the system operates orthogonally.

The result is the same for each of the users in the system and is also realized for different received amplitudes from each of the other users in the system. To demonstrate that a zero crosscorrelation would be obtained when the signal of other users is received at a different amplitude, consider user No. 4 operating with an amplitude K being received by user No. 2. In this instance, the signal $\Sigma$ will be,

| User No. 4 (+K) | $0^K$ | $1^K$ | $0^K$ | $1^K$ | $1^K$ | $1^K$ | $0^K$ | $0^K$ |
|---|---|---|---|---|---|---|---|---|
| User No. 2 (+1) | 0 | 1 | 1 | 1 | 0 | 0 | 1 | 0 |
| $\Sigma =$ | $0^K$ | $0^K$ | $1^K$ | $0^K$ | $1^K$ | $1^K$ | $1^K$ | $0^K$ |
| $= 0^{4K} + 1^{4K} =$ Zero | | | | | | | | |

It can be seen, therefore, that utilizing time permutations of the same N bit noise code can and does provide a protection against self-interference. It is also noted above that interference between users can be further eliminated by having all the users transmitting to the central node on the same frequency band and receiving on a different frequency band from the central node. Another means which can also be utilized for further reducing interference between users is the use of directional antennas with the main beam pointing to the central node as suggested in the present inventor's previous patent U.S. Pat. No. 3,908,088.

Having thus shown and described what is at present considered to be the preferred embodiment of the invention, all modifications, alterations and changes coming within the spirit and scope of the invention as set forth in the appended claims are herein meant to be included.

I claim:

1. An orthogonal code division multiple access communication system comprising:
    a plurality of user communications apparatus, each having transmitter and receiver means;
    each said transmitter means including:
    a code generator means for generating a different time permutation of the same n-bit, direct-sequence, noise coded signal and wherein each said bit assumes either one of two possible digital values
    a bit stuffer means for adding, at the same location in each of said coded signals, a common bit to balance the values of said bits in said signal and thereby form an (n+1)-bit noise coded signal and wherein the number of bits of one of said digital values equals the number of bits of the other of said digital values;
    each of said (n+1)-bit signals having a crosscorrelation value of zero with a linear composite of the other of said (n+1)-bit signals when mutually synchronous with each other;
    each said receiver means including a coherent detection means for autocorrelation detecting one of said (n+1)-bit signals and for eliminating interfernece from the other of said signals through crosscorrelation detection; and
    means for providing a synchronous timed reference for said plurality of user communication apparatus.

2. The communications system as defined by claim 1 wherein said means for transmitting includes means for modulating said noise code by a communication traffic signal which operates to select the n+1 bit code sequence or its complement, and means for modulating an RF carrier frequency by the selected code sequence.

3. The communications system as defined by claim 2 wherein said means for modulating said carrier frequency comprises means for phase modulating said RF carrier frequency.

4. The communications system as defined by claim 1 wherein said coherent detection means includes a multiplier having first and second inputs and an output, one of said inputs being coupled to the noise coded signal received and the other of said inputs being coupled to a means for locally generating a reference noise code, and integrator circuit means coupled to the output of said multiplier for summing the output of said multiplier.

5. The communications system as defined by claim 1 wherein said means for providing a synchronous time reference comprises a central node station for receiving noise coded communications signals transmitted from at least one of said plurality of said user communications apparatus and retransmitting said noise coded signal to at least one other of said plurality of said user communications apparatus.

6. The communications system as defined by claim 5 wherein said central node station includes means for transmitting said noise code signals at a different frequency relative to a reference transmitting frequency of said user communications apparatus and wherein said apparatus is adapted to detect noise coded signals at said difference frequency.

7. The communications system as defined by claim 1 wherein said plurality of user communications apparatus comprises transceiver apparatus.

* * * * *